(12) United States Patent
Li et al.

(10) Patent No.: US 11,449,592 B2
(45) Date of Patent: *Sep. 20, 2022

(54) GESTURE MATCHING MECHANISM

(71) Applicant: Intel Corporation, Santa Clara, CA (US)

(72) Inventors: Wenlong Li, Beijing (CN); Xiaolu Shen, Beijing (CN); Lidan Zhang, Beijing (CN); Jose E. Lorenzo, Santa Clara, CA (US); Qiang Li, Beijing (CN); Steven Holmes, Redwood City, CA (US); Xiaofeng Tong, Beijing (CN); Yangzhou Du, Beijing (CN); Mary Smiley, Santa Clara, CA (US); Alok Mishra, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/066,138

(22) Filed: Oct. 8, 2020

(65) Prior Publication Data
US 2021/0026941 A1 Jan. 28, 2021

Related U.S. Application Data (63) Continuation of application No. 14/911,390, filed as application No. PCT/CN2015/075339 on Mar. 28, 2015, now Pat. No. 10,803,157.

(51) Int. Cl.
*G06F 3/048* (2013.01)
*G06F 21/32* (2013.01)
(Continued)

(52) U.S. Cl.
CPC ............. *G06F 21/32* (2013.01); *G06F 3/017* (2013.01); *G06F 21/30* (2013.01); *G06F 21/36* (2013.01);
(Continued)

(58) Field of Classification Search
CPC .......... G06F 21/32; G06F 21/30; G06F 3/017; G06F 21/36; H04W 12/065; H04W 12/68;
(Continued)

(56) References Cited

U.S. PATENT DOCUMENTS 6,421,453 B1 7/2002 Kanevsky et al.
8,594,374 B1 11/2013 Bozarth
(Continued)

FOREIGN PATENT DOCUMENTS

| CN | 103279253 | 9/2013 |
|---|---|---|
| CN | 103714282 | 4/2014 |
| WO | 2013152454 | 10/2013 |

OTHER PUBLICATIONS

Bir Bhanu, Face Recognition from Face Profile Using Dynamic Time Warping, attached as pdf (Year: 2004).*

(Continued)

*Primary Examiner* — Aleksey Olshannikov
(74) *Attorney, Agent, or Firm* — Hanley, Flight & Zimmerman, LLC (57) ABSTRACT

An example apparatus is disclosed herein that includes a memory and at least one processor. The at least one processor is to execute instructions to: select a gesture from a database, the gesture including a sequence of poses; translate the selected gesture into an animated avatar performing the selected gesture for display at a display device; display a prompt for the user to perform the selected gesture performed by the animated avatar; capture an image of the user performing the selected gesture; and perform a comparison between a gesture performed by the user in the captured image and the selected gesture to determine whether there is a match between the gesture performed by the user and the selected gesture.

21 Claims, 5 Drawing Sheets

(51) Int. Cl.
  *H04L 9/40*     (2022.01)
  *H04L 9/32*     (2006.01)
  *G06F 21/30*    (2013.01)
  *H04W 12/06*    (2021.01)
  *H04W 12/065*   (2021.01)
  *H04W 12/68*    (2021.01)
  *G06V 40/20*    (2022.01)
  *G06F 3/01*     (2006.01)
  *G06F 21/36*    (2013.01)
  *G06T 19/00*    (2011.01)

(52) U.S. Cl.
  CPC .............. *G06T 19/00* (2013.01); *G06V 40/28* (2022.01); *H04L 9/32* (2013.01); *H04L 63/08* (2013.01); *H04W 12/06* (2013.01); *H04W 12/065* (2021.01); *H04W 12/68* (2021.01)

(58) Field of Classification Search
  CPC .......... H04W 12/06; H04L 63/08; H04L 9/32; G06K 9/00355; G06T 19/00
  See application file for complete search history.

(56) References Cited

U.S. PATENT DOCUMENTS

| | | | | |
|---|---|---|---|---|
| 8,856,541 | B1* | 10/2014 | Chaudhury | G06K 9/00912 |
| | | | | 713/186 |
| 9,218,815 | B2 | 12/2015 | Syrdal et al. | |
| 2007/0276270 | A1* | 11/2007 | Tran | A61B 5/002 |
| | | | | 600/508 |
| 2008/0267447 | A1* | 10/2008 | Kelusky | G06F 3/0487 |
| | | | | 382/100 |
| 2009/0307595 | A1 | 12/2009 | Clark et al. | |
| 2014/0125574 | A1 | 5/2014 | Scavezze et al. | |
| 2014/0267009 | A1* | 9/2014 | DeLean | G06F 3/017 |
| | | | | 345/156 |
| 2015/0254444 | A1* | 9/2015 | Herger | G06F 3/023 |
| | | | | 726/19 |
| 2016/0292524 | A1* | 10/2016 | Weiss | G06K 9/00033 |
| 2018/0060550 | A1 | 3/2018 | Li et al. | |

OTHER PUBLICATIONS

International Searching Authority, "Search Report and Written Opinion," issued in connection with PCT patent application No. PCT/CN2015/075339, dated Dec. 31, 2015, 8 pages.

International Searching Authority, "International Preliminary Report on Patentability," issued in connection with PCT patent application No. PCT/CN2015/075339, dated Oct. 3, 2017, 4 pages.

European Patent Office, "Communication pursuant to Rules 70(2) and 70a(2) EPC," issued in connection with EP patent application No. 15886821, Aug. 14, 2018, 8 pages.

European Patent Office, "Intend to Grant," issued in connection with EP patent application No. 15886821, dated Oct. 1, 2020, 27 pages.

United States Patent and Trademark Office, "Notice of Allowance," issued in connection with U.S. Appl. No. 14/911,390, dated May 28, 2020, 28 pages.

United States Patent and Trademark Office, "Final Office action," issued in connection with U.S. Appl. No. 14/911,390, dated Dec. 11, 2019, 17 pages.

United States Patent and Trademark Office, "Non-Final Office action," issued in connection with U.S. Appl. No. 14/911,390, dated Jun. 17, 2019, 16 pages.

United States Patent and Trademark Office, "Final Office action," issued in connection with U.S. Appl. No. 14/911,390, dated Dec. 13, 2018, 19 pages.

United States Patent and Trademark Office, "Non-Final Office action," issued in connection with U.S. Appl. No. 14/911,390, dated Mar. 1, 2018, 21 pages.

European Patent Office, "Communication pursuant to article 94(3)," issued in connection with EP patent application No. 15886821, Feb. 6, 2020, 5 pages.

China National Intellectual Property Administration, "Notice of Second Office Action," issued in connection with CN Application No. 201580077135.0, dated Mar. 31, 2021, 19 pages.

China National Intellectual Property Administration, "Notice of Grant of Patent Right for Invention" Bsued in connection with CN Application No. 201580077135 0, dated Jul. 27, 2021, 5 pages.

* cited by examiner

GESTURE MATCHING MECHANISM

RELATED APPLICATIONS

This patent arises as a continuation of U.S. patent application Ser. No. 14/911,390, which was filed Feb. 10, 2016, which is a nationalization of International Application No. PCT/CN2015/075339, filed on Mar. 28, 2015. U.S. patent application Ser. No. 14/911,390 and International Application No. PCT/CN2015/075339 are hereby incorporated herein by reference in their entireties.

FIELD

Embodiments described herein generally relate to computers. More particularly, embodiments relate to a mechanism for gesture matching.

BACKGROUND

Authentication is implemented in computer security applications to confirm the identify of an individual that is attempting to use a computer system. Common authentication systems may employ biometric (e.g., fingerprint and/or facial recognition) applications to authenticate a user. However, such systems may be subject to counterfeit measures.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a gesture matching mechanism that learns gestures and performs user authentication based on the learned gestures. In one embodiment, the gesture matching mechanism learns gestures during a registration phase in which a user registers a number of gestures for later recognition of a user. Subsequently during an authentication phase, a user is prompted to perform a gesture selected from a database in order to determine whether the user's gesture performance matches the selected gesture. The user is authenticated if a match is detected. In other embodiment, the gesture matching mechanism may be implemented to screen for health warnings by monitoring a user's facial movement over time to detect changes that may indicate a health problem. In a further embodiment, the gesture matching mechanism may be implemented to perform game control, as well as other applications.

Figure 1:
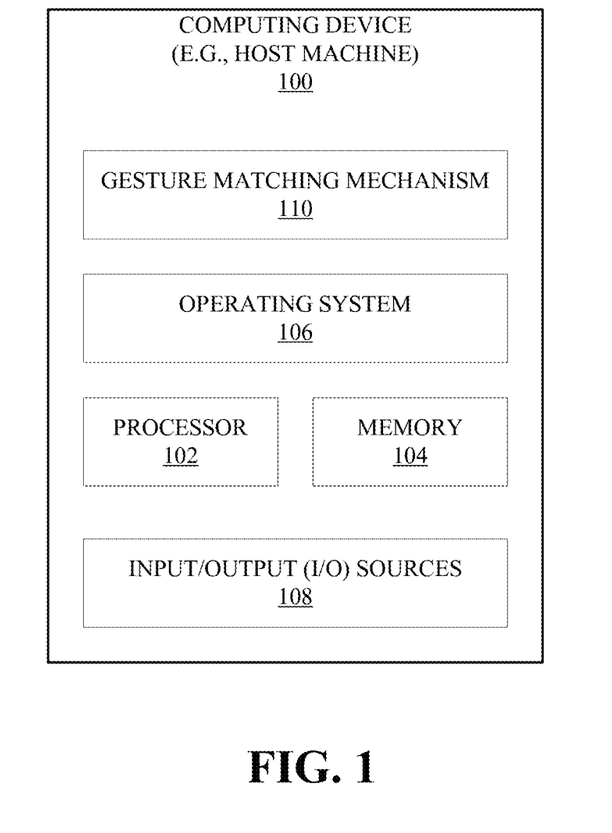
FIG. 1 illustrates a gesture matching mechanism at a computing device according to one embodiment.

FIG. 1 illustrates a gesture matching mechanism 110 at a computing device 100 according to one embodiment. In one embodiment, computing device 100 serves as a host machine for hosting gesture matching mechanism 110 that includes a combination of any number and type of components for facilitating authentication, health indication and/or game control based on gesture recognition at computing devices, such as computing device 100. Computing device 100 may include large computing systems, such as server computers, desktop computers, etc., and may further include set-top boxes (e.g., Internet-based cable television set-top boxes, etc.), global positioning system (GPS)-based devices, etc. Computing device 100 may include mobile computing devices, such as cellular phones including smart-phones, personal digital assistants (PDAs), tablet computers, laptop computers (e.g., notebook, netbook, Ultrabook™, etc.), e-readers, etc.

Computing device 100 may include an operating system (OS) 106 serving as an interface between hardware and/or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", and "software package" may be used interchangeably throughout this document. Similarly, terms like "job", "input", "request" and "message" may be used interchangeably throughout this document.

Figure 2:
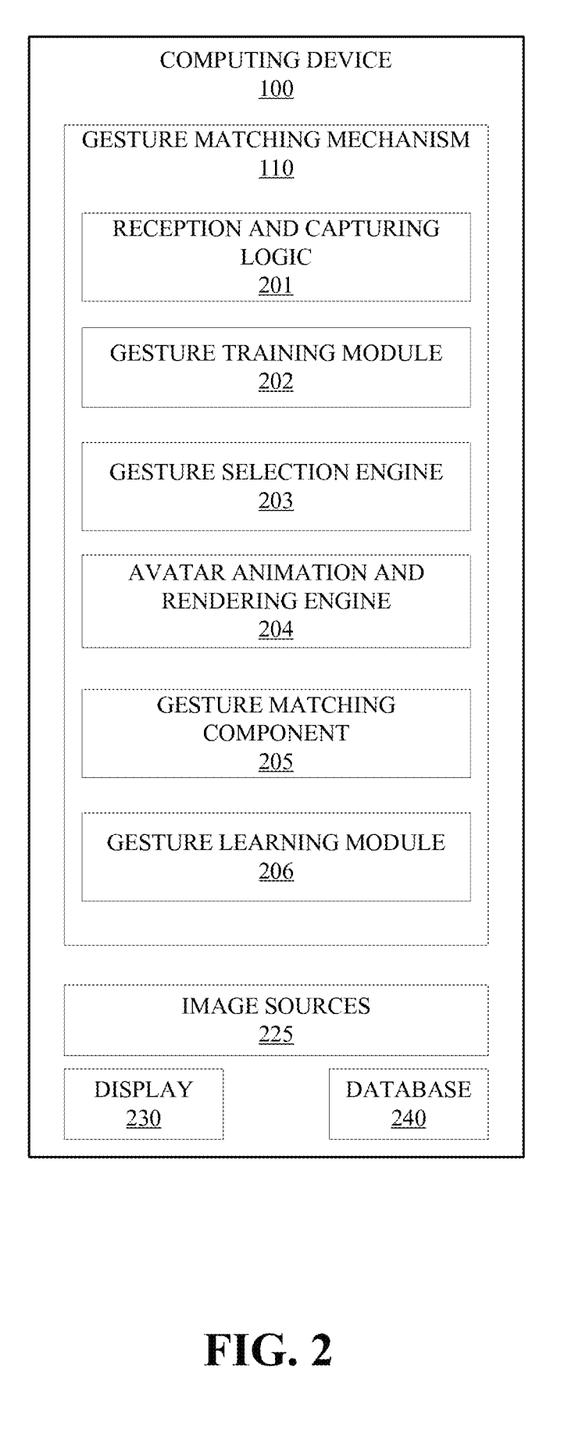
FIG. 2 illustrates a gesture matching mechanism according to one embodiment.

FIG. 2 illustrates a gesture matching mechanism 110 according to one embodiment. In one embodiment, gesture matching mechanism 110 may be employed at computing device 100, such as a laptop computer, a desktop computer, a smartphone, a tablet computer, etc. In one embodiment, gesture matching mechanism 110 may include any number and type of components, such as: reception and capturing logic 201, gesture training module 202, gesture selection engine 203, avatar animation and rendering engine 204, gesture matching component 205 and gesture learning module 206.

In one embodiment, reception and capturing logic 201 facilitates an image capturing device implemented at image sources 225 at computing device 100 to receive and capture an image associated with a user, such as a live and real-time image of a user. As the live image of the user is received and captured, the user's movements may be continuously, and in real-time, detected and tracked in live video frames. In embodiments, reception and capturing logic 201 may receive image data from image source 225, where the image data may be in the form of a sequence of images or frames (e.g., video frames). Image sources 225 may include an image capturing device, such as a camera. Such a device may include various components, such as (but are not limited to) an optics assembly, an image sensor, an image/video encoder, etc., that may be implemented in any combination of hardware and/or software. The optics assembly may include one or more optical devices (e.g., lenses, mirrors, etc.) to project an image within a field of view onto multiple sensor elements within the image sensor. In addition, the optics assembly may include one or more mechanisms to control the arrangement of these optical device(s). For example, such mechanisms may control focusing operations, aperture settings, exposure settings, zooming operations, shutter speed, effective focal length, etc. Embodiments, however, are not limited to these examples.

Image sources 225 may further include one or more image sensors including an array of sensor elements where these elements may be complementary metal oxide semi-conductor (CMOS) sensors, charge coupled devices (CCDs), or other suitable sensor element types. These elements may generate analog intensity signals (e.g., voltages), which correspond to light incident upon the sensor. In addition, the image sensor may also include analog-to-digital converter(s) ADC(s) that convert the analog intensity signals into digitally encoded intensity values. Embodiments, however, are not limited to these examples. For example, an image sensor converts light received through optics assembly into pixel values, where each of these pixel values represents a particular light intensity at the corresponding sensor element. Although these pixel values have been described as digital, they may alternatively be analog. As described above, the image sensing device may include an image/video encoder to encode and/or compress pixel values. Various techniques, standards, and/or formats (e.g., Moving Picture Experts Group (MPEG), Joint Photographic Expert Group (JPEG), etc.) may be employed for this encoding and/or compression.

As aforementioned, image sources 225 may be any number and type of components, such as image capturing devices (e.g., one or more cameras, etc.) and image sensing devices, such as (but not limited to) context-aware sensors (e.g., temperature sensors, facial expression and feature measurement sensors working with one or more cameras, environment sensors (such as to sense background colors, lights, etc.), biometric sensors (such as to detect fingerprints, facial points or features, etc.), and the like. Computing device 100 may also include one or more software applications, such as business applications, social network websites, business networking websites, communication applications, games and other entertainment applications, etc., offering one or more user interfaces (e.g., web user interface (WU), graphical user interface (GUI), touchscreen, etc.) to display the gesture matching and for the user to communicate with other users at other computing devices, while ensuring compatibility with changing technologies, parameters, protocols, standards, etc.

According to one embodiment, gesture matching mechanism 110 operates in two phases. One such phase is a registration phase in which a user registers a number of gestures. In such an embodiment, gesture training module 202 capture a multitude of gestures for later recognition of a user. In one embodiment, gesture training module 202 identifies new gestures from user images captured at reception and capturing logic 201 and adds the gestures to database 240 as animation parameters. According to one embodiment, each new gesture defines a combination of a pose or expression in a single frame. In other embodiments, each gesture defines a sequence of poses or expressions occurring within a predetermined time frame (e.g., seconds). In some embodiments, database 240 may be used to record, store, and maintain data relating to various gestures such as human head, facial, hand and/or finger movements. These gestures may be recorded as sequences of frames where each frame may include multiple features. Database 240 may include a data source, an information storage medium, such as memory (volatile or non-volatile), disk storage, optical storage, etc.

The second phase is an authentication phase in which a user is authenticated based on recognition of a gesture. In one embodiment, a user is prompted to perform a gesture selected from database 240 in order to determine whether the user's gesture performance matches the selected gesture. Gesture selection engine 203 is implemented to randomly select a gesture from database 240 for user authentication. Avatar animation and rendering engine 204 translates the selected gesture into an animated avatar on display 230. Display device 230 may be implemented with various display(s) including (but are not limited to) liquid crystal displays (LCDs), light emitting diode (LED) displays, plasma displays, and cathode ray tube (CRT) displays.

Figure 3:
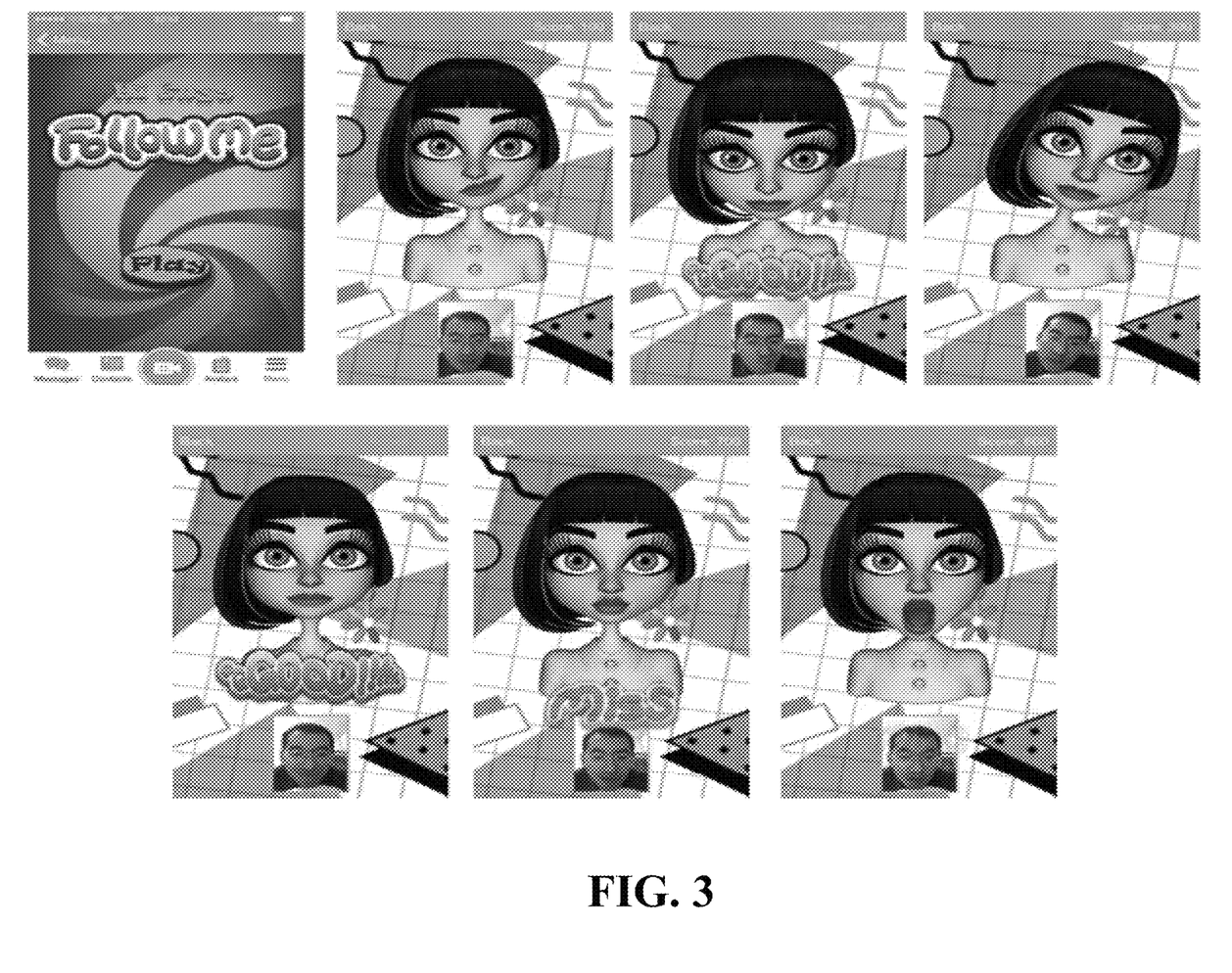
FIG. 3 illustrates avatars displayed by gesture matching mechanism.

In one embodiment, display screen or device 230 visually outputs the avatar to the user. In further embodiments, avatar animation and rendering engine 204 uses Intel® Pocket Avatars®, which blends shapes to animate a selected avatar. In this embodiment, a facial gesture (e.g., mouth open, eye wink, etc.) may be represented by the blend shape parameters that correspond to facial gesture data). FIG. 3 illustrates one embodiment of avatars corresponding to selected gestures that are displayed by avatar animation and rendering engine 204. As shown in FIG. 3, an avatar dynamically poses facial/head gestures.

According to one embodiment, avatar animation and rendering engine 204 facilitates the prompting of a user to perform the pose of the displayed avatar. Referring back to FIG. 2, reception and capturing logic 201 captures the user's response. According to one embodiment, reception and capturing logic 201 captures video within a predetermined time window. Subsequently, gesture matching component 205 compares the captured gesture response with the selected gesture by analyzing the video frame to identify whether the same gesture appears in the predetermined time period.

Gesture matching component 205 automatically selects a key frame and determines the temporal sequence across multiple frames to compare the user's input (e.g., performed gesture) with database 240 to determine if the input matches the selected gesture. In one embodiment, the user's gesture is recorded as a sequence of t frames: $G_{user}=\{p_1, p_2 \ldots p_t\}$, where $p_i$, is the pose and expression parameters for the ith frame. Similarly, each gesture in the database can be represented as a sequence of s frames: $G_{database}=\{p_1, p_2 \ldots p_s\}$. $G_{user}$ and $G_{database}$ are compared by a temporal sequence matching method, such as Dynamic Time Warping. If there is a match, the user is authenticated. Gesture learning module 207 identifies new gestures performed by the user and adds the new gestures to database 240. For instance, if $G_{user}$ doesn't match any gestures database 240, database 240 is updated to include this new gesture. As a result, different gestures may be used for subsequent authentication of the user.

It is contemplated that any number and type of components 201-240 of gesture matching mechanism 110 may not necessarily be at a single computing device and may be allocated among or distributed between any number and type of computing devices, including computing device 100 having (but are not limited to) server computing devices, cameras, PDAs, mobile phones (e.g., smartphones, tablet computers, etc.), personal computing devices (e.g., desktop devices, laptop computers, etc.), smart televisions, servers, wearable devices, media players, any smart computing devices, and so forth. Further examples include microprocessors, graphics processors or engines, microcontrollers, application specific integrated circuits (ASICs), and so forth. Embodiments, however, are not limited to these examples.

Figure 4:
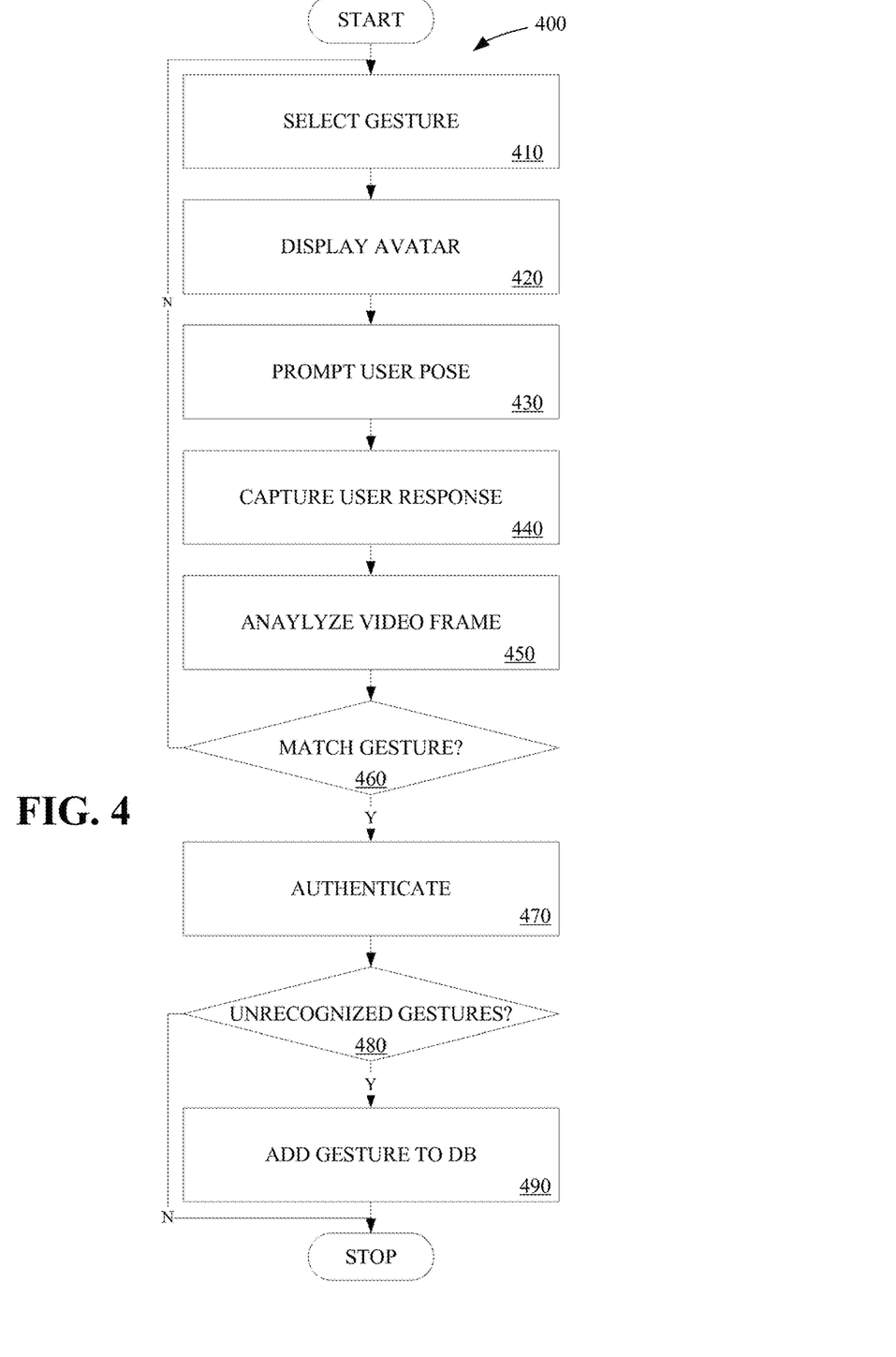
FIG. 4 is a flow diagram illustrating the operation of a gesture matching mechanism according to one embodiment.

FIG. 4 is a flow diagram illustrating a method 400 for facilitating authentication of a user at a gesture matching mechanism operating on a computing device according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by gesture matching mechanism 110. The processes of method 400 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1 and 2 are not discussed or repeated here.

Method 400 begins at block 410 with a gesture being selected from database 240. At processing block 420, the selected gesture is displayed as an avatar. At processing block 430, the user is prompted to pose according to a gesture being displayed by the avatar. At processing block 440 the user pose is captured. At processing block 450, video frame data comprising the user pose is analyzed. At decision block 460, a determination is made as to whether the captured pose includes a gesture that matches the selected gesture. If not, control is returned to processing block 410, where another gesture is selected for authentication. If there is a determination that the captured pose includes a gesture that matches the selected gesture, the user is authenticated at processing block 470. At decision block 480, a determination is made as to whether one or more poses included unrecognized gestures. If so, the gestures are added to the database, processing block 490.

Although described with reference to authentication, other embodiments may feature gesture matching mechanism 110 being implemented to screen for health warnings. In such embodiments, gesture matching mechanism 110 may monitor a user's facial movement (e.g., mouth) over time and analyze the movements for micro changes that may indicate a stroke. In a further embodiment, gesture matching mechanism 110 may be implemented to perform game control.

Figure 5:
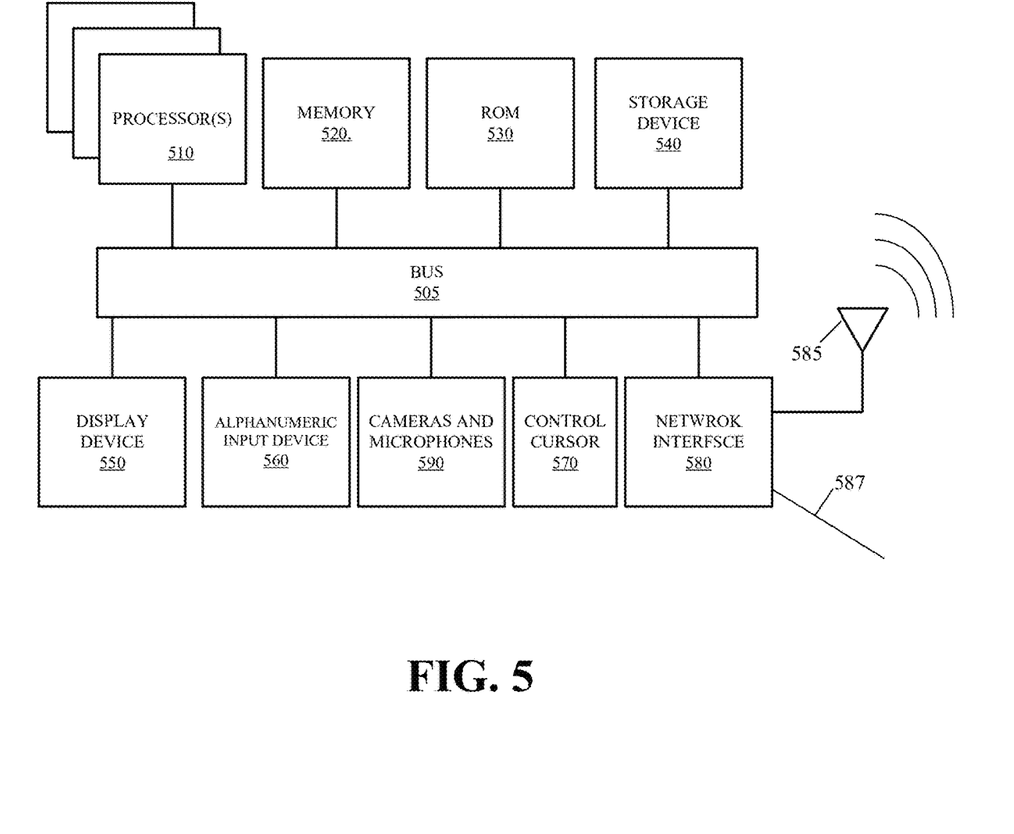
FIG. 5 illustrates a computer system suitable for implementing embodiments of the present disclosure according to one embodiment.

FIG. 5 illustrates one embodiment of a computer system 500. Computing system 500 includes bus 505 (or, for example, a link, an interconnect, or another type of communication device or interface to communicate information) and processor 510 coupled to bus 505 that may process information. While computing system 500 is illustrated with a single processor, electronic system 500 and may include multiple processors and/or co-processors, such as one or more of central processors, graphics processors, and physics processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Date storage device 540 may be coupled to bus 505 to store information and instructions. Date storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, a touchscreen, a touchpad, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., 3rd Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.IIb and/or IEEE 802.IIg standards, and/or the wireless network interface may provide access to a personal area network, for example, by conforming to Bluetooth standards. Other wire-less network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate gesture matching. The apparatus includes a gesture selection engine to select a gesture from a database during an authentication phase, an avatar animation and rendering engine to translate a selected gesture into an animated avatar for display at a display device with a prompt for a user to perform the selected gesture, reception and capturing logic to capture, in real-time, an image of a user and a gesture matching component to compare the gesture performed by the user in the captured image to the selected gesture to determine whether there is a match.

Example 2 includes the subject matter of Example 1, wherein the gesture matching component authenticates the user if the gesture performed by the user in the captured image matches the selected gesture.

Example 3 includes the subject matter of Example 2, wherein the gesture matching component selects a key frame from the user image and determines a temporal sequence across multiple frames to compare the gesture performed by the user to the selected gesture.

Example 4 includes the subject matter of Example 3, wherein the comparison is performed using a temporal sequence matching process.

Example 5 includes the subject matter of Example 1, further comprising a gesture training module to identify gestures from images of a user captured at reception and capturing logic during a registration phase and store the gestures in the database for recognition.

Example 6 includes the subject matter of Example 5, wherein the gesture training module stores the gestures as animation parameters.

Example 7 includes the subject matter of Example 6, wherein one of the captured gestures is selected from the database by the gesture selection engine during the authentication phase.

Example 8 includes the subject matter of Example 1, further comprising a gesture learning module to identify new gestures performed by the user and add the new gestures to the database.

Example 9 includes the subject matter of Example 8, wherein the gesture learning module identifies a new gesture upon the gesture matching component determining that the gesture performed by the user does not match a gesture in the database.

Some embodiments pertain to Example 10 that includes a method to facilitate gesture matching comprising selecting a gesture from a database during an authentication phase, translating the selected gesture into an animated avatar, displaying the avatar, prompting a user to perform the selected gesture, capturing a real-time image of the user and comparing the gesture performed by the user in the captured image to the selected gesture to determine whether there is a match.

Example 11 includes the subject matter of Example 10, further comprising authenticating the user if the gesture performed by the user in the captured image matches the selected gesture.

Example 12 includes the subject matter of Example 11, wherein comparing the gesture performed by the user to the selected gesture comprises selecting a key frame from the user image and determining a temporal sequence across multiple frames.

Example 13 includes the subject matter of Example 11, wherein the comparison is performed using a temporal sequence matching process.

Example 14 includes the subject matter of Example 10, further comprising performing a registration process prior to the authentication phase.

Example 15 includes the subject matter of Example 14, wherein the registration process comprises identifying gestures from captured images of the user and storing the gestures in the database for recognition.

Example 16 includes the subject matter of Example 15, wherein the gestures are stored as animation parameters.

Example 17 includes the subject matter of Example 16, wherein one of the captured gestures is selected from the database during the authentication phase.

Example 18 includes the subject matter of Example 10, further comprising identifying new gestures performed by the user and adding the new gestures to the database.

Example 19 includes the subject matter of Example 18, wherein a new gesture is identified upon determining that the gesture performed by the user does not match a gesture in the database.

Some embodiments pertain to Example 20 that includes at least one machine-readable medium comprising a plurality of instructions that in response to being executed on a computing device, causes the computing device to carry out operations according to any one of claims 10 to 19.

Some embodiments pertain to Example 21 that includes an apparatus to facilitate gesture matching, comprising means for selecting a gesture from a database during an authentication phase, means for translating the selected gesture into an animated avatar, means for displaying the avatar, means for prompting a user to perform the selected gesture, means for capturing a real-time image of the user and means for comparing the gesture performed by the user in the captured image to the selected gesture to determine whether there is a match.

Example 22 includes the subject matter of Example 21, further comprising means for performing registration process prior to the authentication phase.

Example 23 includes the subject matter of Example 22, wherein the means for registration comprises means for identifying gestures from captured images of the user and means for storing the gestures in the database for recognition.

Example 24 includes the subject matter of Example 22, further comprising means for identifying new gestures performed by the user and means for adding the new gestures to the database.

Example 25 includes the subject matter of Example 24, wherein a new gesture is identified upon determining that the gesture performed by the user does not match a gesture in the database.

Some embodiments pertain to Example 26 that includes at least one machine-readable medium comprising a plurality of instructions that in response to being executed on a computing device, causes the computing device to carry out operations comprising selecting a gesture from a database during an authentication phase, translating the selected gesture into an animated avatar, displaying the avatar, prompting a user to perform the selected gesture, capturing a real-time image of the user and comparing the gesture performed by the user in the captured image to the selected gesture to determine whether there is a match.

Example 27 includes the subject matter of Example 26, comprising a plurality of instructions that in response to being executed on a computing device, causes the computing device to further carry out operations comprising performing registration process prior to the authentication phase.

Example 28 includes the subject matter of Example 27, wherein the registration process comprises identifying gestures from captured images of the user and means for storing the gestures in the database for recognition.

Example 29 includes the subject matter of Example 26, comprising a plurality of instructions that in response to being executed on a computing device, causes the computing device to further carry out operations comprising identifying new gestures performed by the user and adding the new gestures to the database.

Example 30 includes the subject matter of Example 29, wherein a new gesture is identified upon determining that the gesture performed by the user does not match a gesture in the database.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The invention claimed is:

1. An apparatus comprising:
   memory;
   machine-readable instructions; and
   at least one processor to execute the instructions to:
      select a gesture from a database, the gesture including a sequence of poses;
      translate the selected gesture into an animated avatar for display at a display device, the animated avatar representative of a user performing the selected gesture, the animated avatar including a face;
      display a prompt for the user to perform the selected gesture performed by the animated avatar;
      cause an image of the user performing the selected gesture to be captured; and
      perform a comparison between a gesture performed by the user in the captured image and the selected gesture to determine whether there is a match between the gesture performed by the user and the selected gesture.

2. The apparatus of claim 1, wherein the at least one processor is to authenticate the user when the gesture performed by the user in the captured image matches the selected gesture.

3. The apparatus of claim 2, wherein the image includes a plurality of frames, and the at least one processor is to:
   select a key frame from the image; and
   determine a temporal sequence across multiple frames for the comparison of the gesture performed by the user to the selected gesture.

4. The apparatus of claim 3, wherein the at least one processor is to apply dynamic time warping to perform the comparison.

5. The apparatus of claim 1, wherein the database includes multiple gestures, and the at least one processor to identify the gestures from a plurality of images of the user captured prior to display of the selected gesture.

6. The apparatus of claim 1, wherein the gesture performed by the user is a first gesture, and the at least one processor is to:
   identify a second gesture performed by the user; and
   add the second gesture to the database.

7. The apparatus of claim 6, wherein the at least one processor is to:
   compare the second gesture to gestures in the database; and
   add the second gesture to the database when the second gesture does not match one of the gestures in the database.

8. The apparatus of claim 1, wherein the at least one processor is to:
   monitor gestures of the user over time; and
   determine if there is a health problem based on a change in the gestures.

9. The apparatus of claim 8, wherein the gestures are facial gestures, and the at least one processor is to detect a micro change in the facial gestures to determine if there is the health problem.

10. The apparatus of claim 9, wherein the facial gestures include movements of a mouth.

11. The apparatus of claim 9, wherein the health problem includes a stroke.

12. The apparatus of claim 1, wherein to translate the selected gesture into the animated avatar, the at least one processor is to blend a plurality of shape features corresponding to facial gesture data.

13. An apparatus comprising:
   memory;
   instructions in the apparatus;
   at least one processor to execute instructions to:
      translate a first gesture into an animated avatar for display at a display device, the animated avatar representative of a user performing the first gesture, the first gesture including a sequence of poses, and the animated avatar including eyes and a mouth; and
      display a prompt for the user to perform the first gesture performed by the animated avatar; and
   an image capturing device to capture an image of a second gesture, the second gesture being the user performing the first gesture, wherein the at least one processor is to perform a comparison between the second gesture performed by the user in the image and the first gesture to determine whether there is a match between the second gesture performed by the user and the first gesture.

14. The apparatus of claim 13, wherein the at least one processor is to authenticate the user when the second performed by the user in the image matches the first gesture.

15. The apparatus of claim 14, wherein the image includes a plurality of frames, and the at least one processor is to:
   select a key frame from the image; and
   determine a temporal sequence across multiple frames for the comparison of the second gesture performed by the user to the first gesture.

16. The apparatus of claim 15, wherein the at least one processor is to use time warping to perform the comparison.

17. The apparatus of claim 13, wherein the at least one processor is to identify the first gesture from a plurality of images of the user captured prior to display of the first gesture.

18. The apparatus of claim 13, wherein at least one processor is to:
   identify a third gesture performed by the user; and
   add the third gesture to a database.

19. The apparatus of claim 18, wherein the at least one processor is to:
   compare the third gesture to gestures in the database; and
   add the third gesture to the database when the third gesture does not match one of the gestures in the database.

20. The apparatus of claim 13, wherein the first and second gestures are facial gestures, and the at least one processor is to:
   monitor the facial gestures of the user over time; and
   determine if there is a health problem based on a change in the facial gestures.

21. The apparatus of claim 20, wherein the at least one processor is to detect a micro change in the facial gestures to determine if there is the health problem.

* * * * *